United States Patent Office 3,468,928
Patented Sept. 23, 1969

3,468,928
**COMPOUNDS OF 1,5-DIMETHYLBICYCLO-
(2.1.1)HEXANE**
Thomas W. Gibson, Cincinnati, Ohio, assignor to The Procter & Gamble Company, Cincinnati, Ohio, a corporation of Ohio
No Drawing. Filed Dec. 20, 1965, Ser. No. 515,217
Int. Cl. C07c 35/28, 61/12, 69/74
U.S. Cl. 260—468    5 Claims

ABSTRACT OF THE DISCLOSURE 1,5-dimethyl-bicyclo(2.1.1)hexyl-2-acetic acid, and related compounds, and processes for their preparation are disclosed. These compounds are useful as perfume components and as flavors.

---

This invention relates to new organic compounds and to a new photochemical process. More specifically, the invention concerns the novel compound, 1,5-dimethylbicyclo(2.1.1)hexyl-2-acetic acid and related compounds.

Bicyclo(2.1.1)hexanes are known. For instance, bicyclo (2.1.1)hexane has been disclosed in Journal of the American Chemical Society 83, 4923 (1961); 5,5-dimethylbicyclo(2.1.1)hexyl-2-carboxylic acid is briefly noted in The Record of Chemical Progress, 22 #1, 39 (1961); and 1,5-dimethyl-5-hydroxy-bicyclo(2.1.1)hexyl-2-acetic acid is found in Journal of the American Chemical Society 79, 4741 (1957).

The sunlight irradiation of carvone has been reported in the literature in Chemische Berichte 41, 1928 (1908) and in Journal of the American Chemical Society 79, 4741 (1957). In each of these reports, a product designated as carvone camphor was obtained

carvone                    carvone camphor

A photochemical process has now been discovered for the preparation of the novel compounds, 1,5-dimethylbicyclo(2.1.1)hexyl-2-acetic acid and esters thereof, utilizing carvone or carvone camphor as a starting material. Novel related compounds have also been discovered.

Accordingly, it is an object of this invention to provide novel organic compounds.

It is a more specific object of this invention to provide novel compounds which are derivatives of 1,5-dimethylbicyclo(2.1.1)hexane, hereinafter referred to as 1,5-dimethylbicyclo(2.1.1)hexane compounds, and which possess unique aromatic characteristics.

It is a further object of this invention to provide a process for the preparation of 1,5-dimethylbicyclo(2.1.1)hexane compounds.

These and other objects are achieved by a photochemical process which comprises subjecting a solution comprising a compound selected from the group consisting of carvone and carvone camphor in a solvent selected from the group consisting of anhydrous alcohol solvents and aqueous solvents to full spectrum ultraviolet radiation, as hereinafter defined, to form a 1,5-dimethylbicyclo(2.1.1)hexane compound of the formula

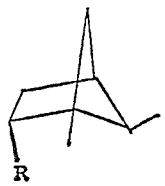

wherein R is selected from the group consisting of

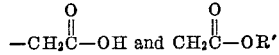

and R' is an alkyl radical containing from about 1 to about 10 carbon atoms.

Both carvone or carvone camphor, the starting materials in the above-defined process, are readily obtainable. Carvone, a component of natural occurring spearmint, dill and caraway oils, is generally purified by rectification and is commercially available. Carvone is also prepared synthetically by the oxidation of limonene.

Carvone camphor is prepared by irradiating carvone with an ultraviolet light source emitting radiation of 200–280 m$\mu$ and/or 320–400 m$\mu$ but emitting substantially no radiation in the 280 m$\mu$–320 m$\mu$ spectrum. Alternatively, special light sources or filters can be used to achieve this result. Such a process for the preparation of carvone camphor is illustrated hereinafter in Example V.

In accordance with the present invention, irradiation of carvone with certain critical photoenergy levels ultimately and unexpectedly produces novel 1,5-dimethylbicyclo(2.1.1)hexane compounds rather than the expected carvone camphor product. Irradiation necessary for the conversion of carvone to 1,5-dimethylbicyclo(2.1.1)hexane compounds must contain: (A) substantial intensity (as used herein "substantial intensity" refers to irradiation of at least 1 watt) at wavelengths ranging from about 200 m$\mu$ to about 280 m$\mu$, preferably concentrated at about 240 m$\mu$, and/or substantial intensity at wavelengths ranging from about 320 m$\mu$ to about 400 m$\mu$, preferably concentrated at about 330 m$\mu$; and (B) substantial intensity at wavelengths ranging from about 280 m$\mu$ to about 320 m$\mu$, preferably concentrated at about 296 m$\mu$. Radiation having these properties is referred to herein, and in the appended claims, as "full spectrum ultraviolet radiation."

In the above-described process, it is believed that the (A) component of the "full spectrum ultraviolet radiation" stimulates the conversion of carvone to carvone camphor. This compound exists as a temporary intermediate but is rapidly transformed by the (B) component of the "full spectrum ultraviolet radiation" to a 1,5-dimethylbicyclo(2.1.1)hexane compound.

Thus, alternatively, carvone camphor can be used as the starting material in the processes of this invention, and necessary radiation for the transformation thereof to a 1,5-dimethylbicyclo(2.1.1)hexane compound is as described in (B) above, i.e., substantial intensity at wavelengths ranging from about 280 m$\mu$ to about 320 m$\mu$, preferably concentrated at about 296 m$\mu$.

When the above described irradiation of carvone or carvone camphor is carried out in an aqueous solvent, i.e., a solvent containing at least about 10% water, the product is 1,5-dimethylbicyclo(2.1.1)hexyl-2-acetic acid:

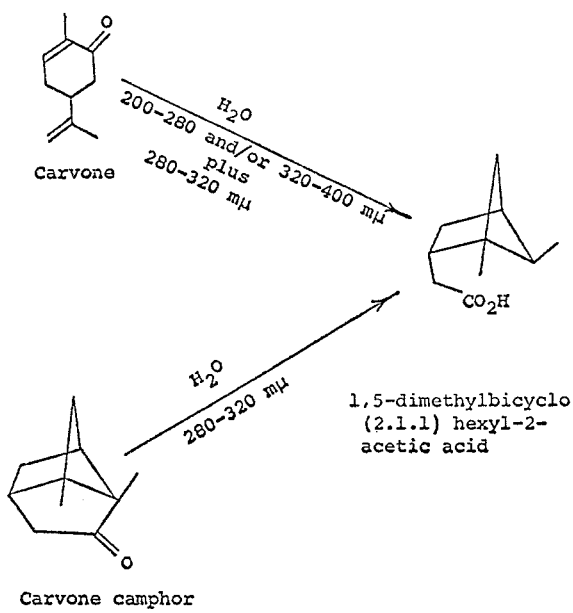

Examples of suitable aqueous solvent systems comprise ethers such as dioxane or tetrahydrofuran and alcohols such as ethanol or t-butanol, each of said organic solvents being combined with from about 10% to about 50% water. A medium comprising about 70% dioxane and 30% water is a preferred aqueous solvent.

When the process of the invention is carried out in an anhydrous alcohol solvent, R'OH, where R' is an alkyl radical containing from about 1 to about 10 carbon atoms, the product obtained is an ester of 1,5-dimethylbicyclo(2.1.1)hexyl-2-acetic acid:

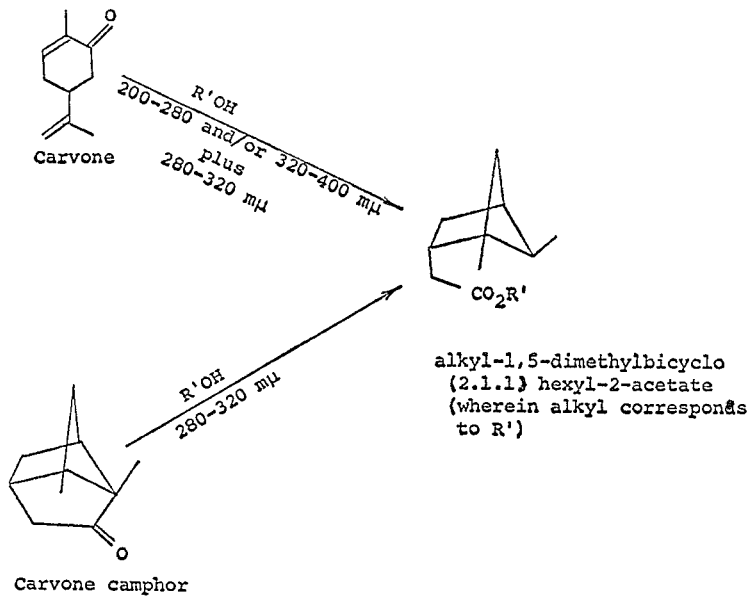

The lower aliphatic monohydric alcohols containing 1 to 10 carbon atoms, such as methyl alcohol, ethyl alcohol, propyl alcohol, iso or n-butyl alcohol, decyl alcohol or the like, are preferred solvents. Use of any one of such anhydrous alcohol solvents provides a substantial yield of the corresponding ester of 1,5-dimethylbicyclo(2.1.1) hexyl-2-acetic acid. For example, proper irradiation of carvone or carvone camphor in methyl alcohol yields methyl-1,5-dimethylbicyclo(2.1.1)hexyl-2-acetate. Similarly, decyl-1,5-dimethylbicyclo(2.1.1)hexyl-2-acetate is obtained when decyl alcohol is used as the solvent. Absolute methanol and ethanol represent particularly preferred alcohol solvents.

The concentration of carvone or carvone camphor in either the aqueous or the alcohol solvent can range from about 0.1% to about 20%, preferably from about 0.5% to about 2%.

Although the exact mechanisms are not fully understood for photocycloaddition reactions, as exemplified by the conversion of carvone to carvone camphor; or for the photolysis of saturated ketones, as in the transformation of carvone camphor to a 1,5-dimethylbicyclo(2.1.1)hexane compound, a rational explanation of the theory underlying the processes of this invention can be advanced: carvone absorbs ultraviolet light in two regions centered near 240 m$\mu$ and 330 m$\mu$. Absorption of energy in either or both of these regions results in the formation of carvone camphor. Carvone camphor, being a saturated ketone, has only one absorption band, centered at 296 m$\mu$, in the accessible ultraviolet range. Absorption of radiant energy at about 296 m$\mu$ transforms carvone camphor to a 1,5-dimethylbicyclo(2.1.1)hexane compound.

Therefore, a light source emitting ultraviolet radiation generally, e.g., sunlight, and more preferably, a light source emitting radiation centered around 240 m$\mu$ and/or 330 m$\mu$ (ranges of 200–280 m$\mu$ and/or 320–400 m$\mu$), is sufficient to convert carvone to carvone camphor. However, in order for the second step in the transformation of carvone to a 1,5-dimethylbicyclo(2.1.1)hexane compound to occur, the light source used must also emit substantial radiation centered about 296 m$\mu$ (range of 280–320 m$\mu$).

Mercury arc lamps are commercially available which simultaneously emit radiation of substantial intensity both in the 280–320 and/or 320–400 m$\mu$ ranges, and in the 200–280 m$\mu$ range, i.e., "full spectrum ultraviolet radiation" is emitted by these lamps. Use of such lamps in accordance with this invention enables one to readily produce 1,5 - dimethylbicyclo(2.1.1)hexane compounds from carvone in a direct one-step process. Other light sources which emit "full spectrum ultraviolet radiation" can also be advantageously used herein. It is to be understood that light sources emitting some radiation outside the specified spectra are satisfactory for use herein so long as the light source does emit radiation of substantial intensity within the required range. For example, a light source emitting visible radiation, e.g., 450 m$\mu$, and/or far ultraviolet radiation, e.g., 150 m$\mu$, is operable herein so long as the light source also emits "full spectrum ultraviolet radiation."

The processes of this invention are preferably carried out in quartz or Vycor apparatus. Conventional glassware generally does not transmit sufficient radiation in the 280 mμ–320 mμ spectrum necessary for the ultimate formation of bicyclo(2.1.1)hexane products.

The hereinbefore-cited prior art processes failed to produce 1,5 - dimethylbicyclo(2.1.1)hexane compounds because the carvone and/or carvone camphor were not subjected to sufficient radiation centered at about 296 mμ. This may have been because less than about 0.01% of the spectrum of sunlight lies in this region, or it may have been because the containers in which the carvone and/or carvone camphor were placed were to efficient as absorbers of radiation centered about 296 mμ. In any event, the carvone and/or carvone camphor were never irradiated with sufficient energy at about 296 mμ to produce a detectable amount of a 1,5-dimethylbicyclo(2.1.1) hexane compound.

It is desirable to carry out the photochemical reactions of the invention in the presence of an inert or non-reactive gas such as nitrogen or carbon dioxide to prevent oxidation, contamination, and the like. In fact, to insure the uniform irradiation of the carvone or carvone camphor starting material, it has been found preferable to bubble nitrogen gas through the reaction medium for the purpose of agitation.

The time of irradiation required for the reaction varies with the intensity and wavelength of the radiation, the quantity of the starting material and the amount of radiation absorbed by the vessels containing the reactants. However, since the ultraviolet absorption spectrum of 1,5-dimethylbicyclo(2.1.1)hexane compounds varies considerably from that of either carvone or carvone camphor, the course of the reaction can easily be followed and be stopped when the ultraviolet absorption spectrum of the solution ceases to change or at a convenient subsequent time. Gas chromatography can also be expediently used to follow the course of the reaction. Generally, increasing the intensity of the "full spectrum ultraviolet irradiation" promotes both the rate of reaction and the yield of the 1,5-dimethylbicyclo(2.1.1)hexane compounds. To complete the reaction at a practical yield and rate, e.g., at least a 10% yield of product within about 400 hours, when a moderate amount of starting material is used, e.g., from about 1 g. to about 50 g. of carvone or carvone camphor, it is preferable to irradiate with at least 10 watts of "fuel spectrum ultraviolet radiation." To obtain this same yield and rate when a larger quantity of starting material is used, e.g., more than about 50 g. of carvone or carvone camphor, it is preferable to irradiate with at least 50 watts of "full spectrum ultraviolet radiation."

The reactions of this invention are primarily photochemical rather than thermodynamic in nature. Thus, the temperature employed can vary widely. However, it is preferable to maintain the reaction temperature below about 40° C., preferably from about 10° C. to about 30° C., to avoid the formation of side reactions, e.g., polymerization products of carvone or carvone camphor can be formed at high temperatures. Therefore, since the temperature of the reaction medium tends to rise during the photolysis due to the heating effect of the necessary light source, heat transfer (cooling) apparatus is advantageously used in conjunction with the process.

When the acetic acid product [1,5-dimethylbicyclo (2.1.1)hexyl-2-acetic acid] is being produced, the product is preferably isolated by conventional extraction techniques utilizing alkaline media to separte the acid component. The ester products, e.g., alkyl-1,5-dimethylbicyclo(2.1.1)hexyl-2-acetate, are isolated preferably by conventional distillation techniques e.g., distilling off the alcoholic solvent in a vacuum. The products can be further purified after isolation by conventional elution and chromatographic techniques. More specific methods of separating and purifying these products are found hereinafter, e.g., in Example III for the acid product and in Examples I and II for the ester products.

Thus, in summary, this invention provides a novel photochemical process which comprises subjecting a solution of carvone to full spectrum ultraviolet radiation or carvone camphor to irradiation of 280–320 mμ wavelengths to form 1,5-dimethylbicyclo(2.1.1)hexane compounds of the formula

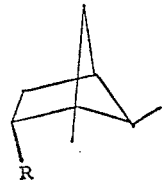

wherein R is selected from the group consisting of

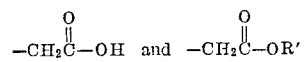

and R' is an alkyl radical containing from about 1 to about 10 carbon atoms. Particular preferred embodiments of said process are as follows: Use of a solvent selected from the group consisting of alcohols, aqueous alcohols, and aqueous ethers, preferably methanol, ethanol, or aqueous dioxane; a concentration of carvone or carvone camphor in the solvent ranging from about 0.1% to about 20%, preferably from about 0.5% to about 2.0%; maintaining the reaction temperature below about 40° C., preferably at about 10° C. to about 30° C.; irradiating carvone with wavelengths centered about 240 mμ and/or 330 mμ, and 296 mμ; or irradiating carvone camphor with a wavelength centered about 296 mμ; and separating the 1,5-dimethylbicyclo(2.2.1)hexane compounds from the reaction medium.

The above-described process offers a direct and convenient path to the bicyclic (2.1.1)hexane ring system as well as providing a simple and direct method of producing novel 1,5-dimethylbicyclo(2.1.1)hexane compounds from a readily available terpene starting material, i.e., carvone.

In summary, novel 1,5-dimethylbicyclo(2.1.1)hexane compounds which can be prepared directly by means of the photochemical process of this invention have the general formula:

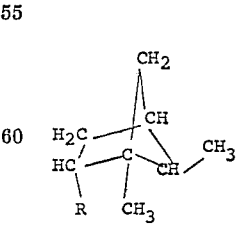 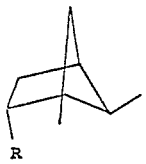

(abbreviated form)

wherein R is selected from the group consisting of

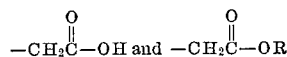

and R' is an alkyl radical containing from about 1 to about 10 carbon atoms.

Illustrative examples of such compounds are listed in the following table.

| Compound | Formula 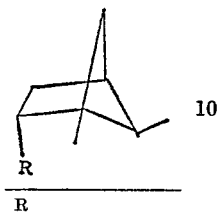 R |
|---|---|
| 1,5-dimethylbicyclo(2.1.1)hexyl-2-acetic acid | —CH$_2$$\overset{O}{\overset{\|\|}{C}}$—OH |
| Alkyl-1,5-dimethylbicyclo(2.1.1)hexyl-2-acetate | —CH$_2$$\overset{O}{\overset{\|\|}{C}}$—OR' (R'=alkyl with 1–10 C's) |
| Methyl-1,5-dimethylbicyclo(2.1.1)hexyl-2-acetate | —CH$_2$$\overset{O}{\overset{\|\|}{C}}$—OCH$_3$ |
| Ethyl-1,5-dimethylbicyclo(2.1.1)hexyl-2-acetate | —CH$_2$$\overset{O}{\overset{\|\|}{C}}$—OC$_2$H$_5$ |
| Octyl-1,5-dimethylbicyclo(2.1.1)hexyl-2-acetate | —CH$_2$$\overset{O}{\overset{\|\|}{C}}$—OC$_8$H$_{17}$ |
| Decyl-1,5-dimethylbicyclo(2.1.1)hexyl-2-acetate | —CH$_2$$\overset{O}{\overset{\|\|}{C}}$—OC$_{10}$H$_{21}$ |

Novel 1,5-dimethylbicyclo(2.1.1)hexane compounds, other than the acid and esters exemplified above and which are obtained directly from the irradiation of carvone or carvone camphor, have been discovered and are a part of this invention. These compounds are represented by the general formula:

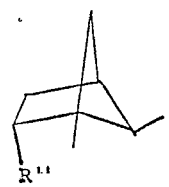

wherein R" is selected from the group consisting of —CH$_2$CH$_2$OH, $$-CH_2CH_2O\overset{O}{\overset{\|\|}{C}}R', \text{ and } -\overset{O}{\overset{\|\|}{C}}-OR'$$

and R' is an alkyl radical containing from about 1 to about 10 carbon atoms. Such compounds are all prepared by use of either 1,5-dimethylbicyclo(2.1.1)hexyl-2-acetic acid or an ester thereof as a starting material.

Specific examples of these compounds are listed below and methods of preparing them are illustrated hereinafter in Examples VI to VIII.

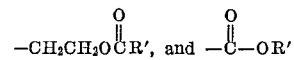

| Compound | R" | Example (illustrating method of preparation) |
|---|---|---|
| 2-(1,5-dimethylbicyclo[2.1.1]hexyl-2)ethanol | —CH$_2$CH$_2$OH | VII |
| 2-(1,5-dimethylbicyclo[2.1.1]hexyl-2)ethylcarboxylates | —CH$_2$CH$_2$O$\overset{O}{\overset{\|\|}{C}}$R' <br> R'=alkyl with 1–10 C's | VIII |
| 2-(1,5-dimethylbicyclo[2.1.1]hexyl-2)ethylacetate | —CH$_2$CH$_2$O$\overset{O}{\overset{\|\|}{C}}$CH$_3$ | VIII |
| 2-(1,5-dimethylbicyclo[2.1.1]hexyl-2)ethylpropanoate | —CH$_2$CH$_2$O$\overset{O}{\overset{\|\|}{C}}$C$_2$H$_5$ | VIII |
| 2-(1,5-dimethylbicyclo[2.1.1]hexyl-2)ethyldecanoate | —CH$_2$CH$_2$O$\overset{O}{\overset{\|\|}{C}}$C$_9$H$_{19}$ | VIII |
| Alkyl-1,5-dimethylbicyclo[2.1.1]hexyl-2-carboxylates | —$\overset{O}{\overset{\|\|}{C}}$—OR' <br> R'=alkyl with 1–10 C's | VI |
| Methyl-1,5-dimethylbicyclo[2.1.1]hexyl-2-carboxylate | —$\overset{O}{\overset{\|\|}{C}}$—OCH$_3$ | VI |

Thus, in terms of novel compositions of matter, this invention provides 1,5 - dimethylbicyclo(2.1.1)hexane compounds of the general formula

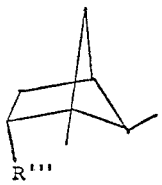

wherein R''' is selected from the group consisting of

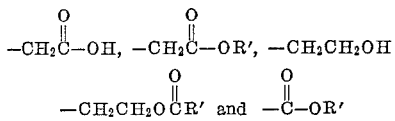

and R' is an alkyl radical containing from about 1 to about 10 carbon atoms.

The above compounds have utility as odorants for the compounding of perfume, flavor, and other compositions, as discussed below.

The alkyl - 1,5 - dimethylbicyclo(2.1.1)hexyl-2-carboxylates exhibit an odor characterized as "pine." This odor is most intense when alkyl is methyl and decreases with increasing alkyl chain length. Thus, methyl-1,5-dimethylbicyclo(2.1.1)hexyl - 2 - carboxylate is a preferred compound of this group. These compounds therefore find utility in compositions such as soaps and detergents, aerosol "pine-odor" sprays for synthetic Christmas trees, room deodorants, personal deodorants, spike lavender perfumes, and the like, wherein they can be used in amounts of about 0.0001% to about 10% to impart desirable odors to said compositions.

The 2-(1,5-dimethylbicyclo[2.1.1]hexyl-2)ethylcarboxylates have an odor and flavor characterized as "sweet and woody." This odor and flavor is most intense with 2 - (1,5 - dimethylbicyclo[2.1.1]hexyl - 2)ethylacetate (therefore, this compound is a preferred member of the group) and decreases as the ester chain length increases. These compounds therefore find utility in compositions such as soaps and detergents, colognes (especially of a masculine nature), room deodorants, dentifrices, shoe polish, lavender and lavendin perfumes and the like, wherein they can be used in amounts of about 0.0001% to about 10% to impart desirable odors to said compositions. 2-(1,5-dimethylbicyclo[2.1.1]hexyl-2)ethanol has a similar "sweet and woody" odor, and thus can be used in the same manner as the ethylcarboxylates.

The alkyl - 1,5 - dimethylbicyclo(2.1.1)hexyl - 2-acetate compounds have an odor characterized as "dry lavender." This odor is most intense when alkyl is methyl or ethyl and decreases with increasing alkyl chain length. Thus, methyl- and ethyl - 1,5 - dimethylbicyclo(2.1.1)hexyl - 2-acetate are preferred members of this group. These compounds therefore find utility in compositions such as soap bars, room deodorants, personal deodorants, cosmetics, colognes (especially of a floral nature), lavender, spike lavender and lavendin perfumes and the like, wherein they can be used in amounts of about 0.0001% to about 10% to impart desirable odors to said compositions.

1,5-dimethylbicyclo(2.1.1)hexyl-2-acetic acid has only a very slight odor. However, this compound can be readily converted by conventional esterification to the above-discussed highly useful alkyl-1,5-dimethylbicyclo(2.1.1) hexyl-2-acetate compounds, e.g., treatment of 1,5-dimethylbicyclo(2.1.1)hexyl-2-acetic acid with methanol in the presence of sulfuric acid yields methyl-1,5-dimethylbicyclo(2.1.1)hexyl-2-acetate.

In addition to the above odorant utility, the novel compounds of this invention are useful as intermediates in organic synthesis, particularly in the synthesis of other bicyclo(2.1.1)hexane compounds.

The following examples illustrate the invention but are not intended to be limiting. All percentages and ratios in the following examples, as well as in this specification and the appended claims, are by weight unless otherwise indicated.

All carvone used in the following examples was "d-Carvone, B.P. 98–100° C./10 mm." obtained from Matheson, Coleman and Bell. Use of 1-carvone gives products which are enantiomorphic to those reported herein for d-carvone.

Prior to use, the carvone was distilled through a spinning band column, and showed $[\alpha]_D^{25} + 51.60°$

[c.=5.13 EtOH]

Unless otherwise so indicated, all irradiations in the following examples was performed in a conventional photochemical reaction flask equipped with a nitrogen flush and a Vycor immersion well. Nitrogen was bubbled through the reaction mixtures and the temperature was maintained in the range of 10°C.–30° C. by means of a water jacket during the irradiations.

N.m.r. spectra were obtained on a Varian Associates HA–100 spectrometer unless noted otherwise. Gas chromatographic analyses were performed on an Aerograph A–90P instrument using Carbowax 20M packed columns in the range of 60°–200° C. Microanalyses were obtained on a Perkin-Elmer infracord spectrometer, and ultraviolet spectra were obtained from a Cary Model 14 spectrometer.

The light sources used in the following examples were commercially available mercury lamps. More specific data on the lamps used are tabulated as follows:

|  | Radiation Source* | | | |
| --- | --- | --- | --- | --- |
|  | Hanovia 608A [1] | Hanovia 654A [1] | Hanovia 679A [1] | Rayonet [2] |
|  | Power (Watts) | | | |
|  | 100 | 200 | 450 | 24 |
| Ultraviolet Spectral Characteristics (Watts): | | | | |
| 200 mμ–280 mμ | 1.14 | 2.88 | 27.0 | About 90% centered about 350 mμ |
| 280 mμ–320 mμ | 1.97 | 4.14 | 28.7 | |
| 320 mμ–400 mμ | 1.53 | 3.46 | 28.0 | |
| Total radiated energy | 11.49 | 25.18 | 175.8 | 22 |

[1] Obtained from Hanovia Lamp Division, Englehard Industries.
[2] Obtained from Southern New England Ultraviolet Company.
*It is to be noted that the Hanovia Lamps emitted full-spectrum ultraviolet radiation, as defined herein.

EXAMPLE I

Irradiation of carvone to form ethyl-1,5-dimethylbicyclo (2.1.1)hexyl-2-acetate

A solution of 1 g. of carvone in 150 ml. of absolute ethanol was irradiated with a Hanovia 654A mercury arc lamp for 20 hours. At this time, vapor phase chromatography showed only a trace of carvone remaining. The ethanol was removed by vacuum distillation and the residue chromatographed over 30.0 g. of silica gel. Elution with pentane gave about 0.200 g. of a viscous oil which appeared to be dimeric material. Continued elution with 10% ether in pentane gave 0.530 g. of uncontaminated product, ethyl - 1,5 - dimethylbicyclo(2.1.1)hexyl - 2-acetate. Further purification by gas chromatography gave product with $n_D^{25}$ 1.4524, $[\alpha]_D^{25}$ —51.5° [4.76, EtOH], $\lambda_{max}$ 5.75μ (neat), and n.m.r. signals at $\tau$ 9.07 (3H, singlet), 8.94 (3H, doublet), 8.73 (3H, triplet), 7.98, 7.72, and 5.84 (2H, quartet). The mass spectrum gave a parent peak at mass 196.

*Analysis.*—Calculated for $C_{12}H_{20}O_2$: C, 73.43; H, 10.27. Found: C. 73.31; H, 10.31. This compound had an odor characterized as "dry lavender".

EXAMPLE II

Irradiation of carvone to form methyl-1,5-dimethyl-bicyclo(2.1.1)hexyl-2-acetate A solution of 12.14 g. of carvone in 450 ml. of methanol was irradiated with a Hanovia 654A mercury arc lamp for 80 hours. At this time, no carvone remained and the methanol was removed in vacuum. Vacuum distillation of the residue gave 7.07 g. of methyl-1,5-dimethylbicyclo (2.1.1)hexyl-2-acetate (B.P.$_{5.5}$ 79–83° C.). Gas chromatograph purification gave material with $n_D^{25}$ 1.4548, $[\alpha]_D^{25}$ —47.5° [4.91, EtOH], $\lambda_{max}$ 5.77μ (in $CH_2Cl$), and n.m.r. signals at $\tau$ 9.06 (3H, singlet), 8.93 (3H, doublet), 7.95, 7.69, and 6.31 (3H singlet).

*Analysis.*—Calculated for $C_{11}H_{18}O_2$: C, 72.49; H, 9.96. Found: C, 72.53; H. 10.02.

In this example, other aliphatic alcohols can be substituted for methanol to produce the corresponding esters. For example, butyl - 1,5 - dimethylbicyclo(2.1.1)hexyl-2-acetate is produced when butanol is used as the solvent; hexyl - 1,5 - dimethylbicyclo(2.1.1)hexyl - 2 - acetate is produced with hexanol as a solvent; and decyl-1,5-dimethylbicyclo(2.1.1)hexyl-2-acetate is produced with decyl alcohol as the solvent. The compounds of this example have an odor characterized as "dry lavender."

EXAMPLE III

Irradiation of carvone in an aqueous ether solvent to form 1,5-dimethylbicyclo(2.1.1)hexyl-2-acetic acid A solution of 93.4 g. of carvone in 4.4 l of aqueous dioxane (73% dioxane, 27% water) was irradiated with a Hanovia 679A high pressure mercury arc lamp for 120 hours. The solvent was then removed and the residue extracted with a saturated sodium carbonate solution. The alkaline solution was then acidified with dilute HCl, extracted with ether and methylene chloride, and dried. Distillation yielded 18.3 g. of 1,5-dimethylbicyclo(2.1.1) hexyl-2-acetic acid. Crystallization from formic acid gave material with M.P. 50°–52° C., and $$[\alpha]_{5461}^{25} -89.3° [1.82 \text{ EtOH}]$$

*Analysis.*—Calculated for $C_{10}H_{16}O_2$: C, 71.39; H, 9.59. Found: C, 71.33; H, 9.63.

In this example, other aqueous ether solvents such as tetrahydrofuran combined with from about 10% to about 50% water, e.g., a solvent comprised of 60% tetrahydrofuran and 40% water, can be substituted for the aqueous dioxane solvent with similar results, i.e., 1,5-dimethylbicyclo(2.1.1)hexyl-2-acetic acid is readily produced.

EXAMPLE IV

Irradiation of carvone in an aqueous alcoholic solvent to form 1,5-dimethylbicyclo(2.1.1)hexyl-2-acetic acid A solution of 1 g. of carvone dissolved in 135 ml. of 50% aqueous ethanol was irradiated for 22 hours with a Hanovia 659A mercury arc lamp. About half of the solvent was then removed by distillation, and the residue extracted with ether. Extraction of the ether solution with sodium carbonate yielded 0.4732 g. of 1,5-dimethylbicyclo(2.1.1)hexyl-2-acetic acid which had an infrared spectrum identical to that of the product prepared in Example III.

In this example, other aqueous alcoholic solvents, such as propanol, butanol, or decyl alcohol, each combined with 10% to about 50% water, can be substituted for the aqueous ethanol solvent with similar results, e.g., 1,5-dimethylbicyclo(2.1.1)hexyl-2-acetic acid is readily produced when a solvent comprised of 70% butanol and 30% water is used.

EXAMPLE V

Part A.—Formation of carvone camphor

A solution of 1.13 g. of carvone dissolved in 100 ml. of absolute ethanol in a round quartz flask was irradiated with sixteen 350 mμ Rayonet mercury resonance lamps placed in a circular array. Periodic analysis indicated the formation of carvone camphor with some ethyl-1,5-dimethylbicyclo(2.1.1)hexyl-2-acetate being formed also. After 108 hours, the mixture was comprised of 34% carvone camphor, 14% ethyl-1,5-dimethylbicyclo(2.1.1) hexyl-2-acetate and 47% carvone. The reaction was then stopped, the solvent removed by distillation, and the carvone camphor purified by gas chromatography. The carvone camphor showed M.P. 101–2° C. $[\alpha]_D^{25}$ +75° [1.50, EtOH]. Infrared spectrum in $CH_2Cl_2$ showed $\lambda_{max}$ 5.80μ. The n.m.r. spectrum showed singlet signals due to two methyl groups at $\tau$ 8.86 and 8.97.

Part B.—Irradiation of carvone camphor

A solution of 0.0429 g. of carvone camphor dissolved in 5.0 ml. of ethanol was irradiated with a Hanovia 608A mercury arc lamp in a quartz flask for 2 hours and 40 minutes. The ethanol was removed by distillation and the product, ethyl-1,5-dimethylbicyclo(2.1.1)hexyl-2-acetate, was purified by gas chromatography. Analysis of this product was identical to the same product obtained in Example I.

In this example, other alcoholic solvents can be substituted for the ethanol to produce the corresponding ester. For example, when methanol is substituted for ethanol, methyl-1,5-dimethylbicyclo(2.1.1)hexyl-2-acetate is the product; similarly, decyl alcohol can be used as the solvent to produce decyl-1,5-dimethylbicyclo(2.1.1) hexyl-2-acetate.

Also in this example, an aqueous solvent such as aqueous alcohol, aqueous dioxane or the aqueous solvents of Examples III and IV, can be substituted for the ethanol solvent whereby the product is 1,5-dimethylbicyclo-(2.1.1)hexyl-2-acetic acid, e.g., use of a solvent comprised of 70% dioxane and 30% water in this example results in the formation of 1,5-dimethyl(2.1.1.)hexyl-2-acetic acid as the product.

EXAMPLE VI

Preparation of methyl-1,5-dimethylbicyclo(2.1.1)hexyl-2-carboxylate

A solution of 7.67 g. of methyl-1,5-dimethylbicyclo-(2.1.1)hexyl-2-acetate (prepared in Example II) dissolved in 100 ml. of dry benzene was added to a solution of Grignard reagent prepared in ether solution from 23.0 g. bromobenzene and 3.1 g. magnesium. The mixture was heated at reflux for one hour, cooled, decomposed with saturated $NH_4Cl$ solution, and extracted with ether. Removal of the solvent from the organic extract gave a crude alcohol which showed no evidence of carbonyl-containing compounds in the infrared spectrum. The alcohol was taken up in 100 ml. of acetic anhydride, heated at reflux for about 2 hours, and distilled slowly at atmospheric pressure until the acetic anhydride was removed. The residue was dissolved in pentane, washed with saturated $Na_2CO_3$, dried, and the solvent removed. The infrared spectrum of the residue indicated the presence of some alcohol and acetate; therefore, the dehydration was repeated. Ozonolysis of the product was performed at —78° C. in $CH_2Cl_2$. The blue solution thus formed was poured into a mixture of 330 ml. acetic acid and 202 ml. water, and 66 ml. of 30% hydrogen peroxide was then added. After storage for 3 days at room temperature, the solution was extracted with methylene chloride and the organic layer was washed with saturated $FeSO_4$, then extracted with dilute NaOH. The alkaline solution was acidified with HCl and extracted with ether to give, after drying and evaporation of solvent, 4.8 g. of crude 1,5-dimethylbicyclo(2.1.1)hexyl-2-carboxylic acid. The acid was esterified with excess diazomethane and distilled to give 2.2 g. of methyl-1,5-dimethylbicyclo(2.1.1)hexyl-2-carboxylate, B.P.$_{6.2}$ 63° C. This ester showed $\lambda_{max}$ 5.74µ, $[\alpha]\,_{5461}^{25}$ —84.9° (3.45 EtOH)

$n_D^{25}$ 1.4517, and n.m.r. signals at τ 8.94 (3H singlet), 8.93 (3H, doublet, J=7), 8.93 (1H, triplet, J=6.5), a 5 proton group at 8.1, 7.35 (1H, triplet, J=7) and 6.32 (3H, singlet).

*Analysis.*—Calculated for $C_{10}H_{16}O_2$: C, 71.39; H, 9.59. Found: C, 71.31; H, 9.50. This compound had an odor characterized as "pine."

In this example, homologous esters having a similar "pine" odor, i.e., alkyl-1,5-dimethylbicyclo(2.1.1)hexyl-2-carboxylates, can be prepared by esterification of the crude carboxylic acid with an appropriate alcohol in the presence of an acid catalyst. For example, substitution of ethanol for diazomethane, in the presence of sulfuric acid, yields ethyl-1,5-dimethylbicyclo(2.1.1)hexyl-2-carboxylate as the product. Similarly, esterification with decanol in the presence of sulfuric acid yields decyl-1,5-dimethylbicyclo(2.1.1)hexyl-2-carboxylate as the product.

EXAMPLE VII

Preparation of 2-(1,5-dimethylbicyclo[2.1.1] hexyl-2) ethanol

A solution of 4.00 g. of ethyl-1,5-dimethylbicyclo[2.1.1]hexyl-2-acetate (prepared in Example I) in 50 ml. of ethyl ether was added to 0.8 g. LiAlH₄ in 20 ml. of ether. After stirring for 30 minutes, the mixture was decomposed with saturated Na₂SO₄ solution, filtered, dried over MgSO₄, and the solvent evaporated. Distillation gave 3.00 g. of crude proruct, B.P.$_{2.0}$ 82–84° C., shown to be about 90% pure by gas chromatography. The material was purified by gas chromatography to yield 2-(1,5-dimethylbicyclo [2.1.1]hexyl-2)ethanol which showed $n_D^{27}$ 1.4701, $[\alpha]_D^{25}$ —70.8° (2.33, EtOH, $\lambda_{max}$ 2.95 and 9.50µ, and n.m.r. signals (60 mc.) at τ 9.04 (3H singlet), 8.93 (3H, doublet, J=6.5 c.p.s.), 8.8–9.1 (2H), 7.9–8.8 (7H), 7.74 (OH), and 6.37 (2H, triplet, J=6 c.p.s.). The alcohol did not give a satisfactory microanalysis.

The hydrogen phthalate of this compound had M.P. 95–7° C., recrystallized from pentane.

*Analysis.*—Calculated for $C_{18}H_{22}O_4$: C, 71.50; H, 7.33. Found: C, 71.51; H, 7.32. This compound had an odor characterized as "sweet and woody."

EXAMPLE VIII

Preparation of 2-(1,5-dimethylbicyclo[2.1.1] hexyl-2)ethylacetate

The 2-(1,5-dimethylbicyclo[2.1.1]hexyl-2)ethanol prepared in Example VIII (1.156 g.) was dissolved in 2 ml. acetic anhydride and 1 drop of pyridine was added. After standing overnight at room temperature, vacuum distillation gave 1.155 g. of 2-(1,5-dimethylbicyclo[2.1.1]hexyl-2)ethylacetate, B.P.$_{0.6}$ 70° C., shown to be 99% pure by gas chromatography. Material purified by gas chromatography showed $\lambda_{max}$ 5.73 and 8.08µ, $[\alpha]_D^{25}$ —46.6° (2.5, EtOH) and n.m.r. spectrum essentially identical to the starting alcohol, except for a signal at τ 7.95 for the acetate methyl group, and the methylene group adjacent to the acetate at τ 5.85. Like the alcohol, the acetate gave poor microanalyses. This compound had an odor characterized as "sweet" and "woody."

In this example, homologous esters having similar "sweet" and "woody" odors, i.e., 2-(1,5-dimethylbicyclo [2.1.1]hexyl-2)ethylcarboxylates, can be prepared. For example, substitution of propionic anhydride for the acetic anhydride of the example results in the formation of 2 - (1,5-dimethylbicyclo[2.1.1]hexyl-2)ethylpropionate as the product; a similar substitution of decanoic acid for the acetic anhydrire of the example used in conjunction with a strong acid catalyst such as sulfuric acid yields 2-(1,5-dimethylbicyclo[2.1.1]hexyl-2)ethyldecanoate as the product.

What is claimed is:

1. 1,5-dimethylbicyclo(2.1.1)hexane compounds of the formula

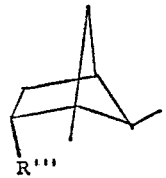

wherein R''' is selected from the group consisting of

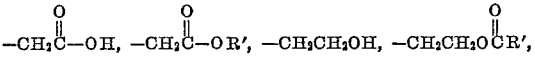

and

and R' is an alkyl radical containing from about 1 to about 10 carbon atoms.

2. The 1,5-dimethylbicyclo(2.1.1)hexane compound of claim 1 wherein R''' is

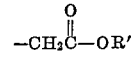

and R' is a radical selected from the group consisting of methyl and ethyl.

3. The 1,5-dimethylbicyclo(2.1.1)hexane compound of claim 1 wherein R''' is

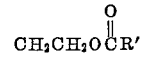

and R' is a radical selected from the group consisting of methyl and ethyl.

4. Methyl-1,5-dimethylbicyclo(2.1.1)hexyl-2-carboxylate.

5. 2-(1,5-dimethylbicyclo[2.1.1]hexyl-2)ethylacetate.

References Cited

Meinwald et al.: JACS 82, 2857–63 (1960).
Meinwald et al.: JACS 84, 977–83 (1962).
Wiberg et al.: JACS 85, 3188–93 (1963).
Meinwald et al.: JOC 29, 3469–73 (1964).
Bond et al.: Tetrahedron Letters No. 51 (4685–86), 1965.

LORRAINE A. WEINBERGER, Primary Examiner

P. J. KILLOS, Assistant Examiner

U.S. Cl. X.R.

204—158; 252—522; 260—410, 488, 514, 617